US010363799B2

United States Patent
Ma

(10) Patent No.: US 10,363,799 B2
(45) Date of Patent: Jul. 30, 2019

(54) COACH DOOR OF VEHICLE OPENABLE AND CLOSABLE REGARDLESS OF ORDER

(71) Applicants: Hyundai Motor Company, Seoul (KR); Kia Motors Corporation, Seoul (KR)

(72) Inventor: Dong-Hee Ma, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 45 days.

(21) Appl. No.: 15/838,582

(22) Filed: Dec. 12, 2017

(65) Prior Publication Data
US 2019/0077233 A1    Mar. 14, 2019

(30) Foreign Application Priority Data
Sep. 11, 2017 (KR) .......... 10-2017-0115938

(51) Int. Cl.
| | |
|---|---|
| *B60J 10/08* | (2006.01) |
| *B60J 5/04* | (2006.01) |
| *E05D 15/58* | (2006.01) |
| *E05D 3/12* | (2006.01) |
| *E05D 15/28* | (2006.01) |
| *E05F 1/12* | (2006.01) |
| *E05F 15/611* | (2015.01) |

(52) U.S. Cl.
CPC .......... *B60J 5/0488* (2013.01); *B60J 5/0479* (2013.01); *E05D 3/127* (2013.01); *E05D 15/28* (2013.01); *E05D 15/58* (2013.01); *E05F 1/12* (2013.01); *E05F 15/611* (2015.01); *E05D 2015/586* (2013.01); *E05D 2700/00* (2013.01); *E05Y 2900/531* (2013.01)

(58) Field of Classification Search
CPC .......... E05Y 2900/20; E05Y 2900/132; E05Y 2800/00; A47F 3/043; E05D 2003/027; Y10T 292/1047; Y10T 292/1082; E05B 81/06; E05B 77/26; Y10S 292/23
USPC ......... 296/146.9, 146.1, 146.11, 202, 146.12
See application file for complete search history.

(56) References Cited

U.S. PATENT DOCUMENTS

| | | | | |
|---|---|---|---|---|
| 5,491,875 A | * | 2/1996 | Siladke .................. | B60J 5/0479 16/346 |
| 5,561,887 A | * | 10/1996 | Neag ...................... | E05D 3/127 16/334 |

(Continued)

FOREIGN PATENT DOCUMENTS

KR    2005-0101464 A    10/2005

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A coach door of a vehicle is provided. The door includes a hinge assembly that has a first hinge hinged to a vehicle body and a second hinge hinged to the first hinge and engaged with a rear end of a rear door. An opening start device rotates the rear end of the rear door to the outside of the vehicle at an early stage of opening of the rear door and a closing end device rotates the rear end of the rear door to the inside of the vehicle at a last stage of closing of the rear door. A guide unit is configured to guide a front end of the rear door to move the front end of the rear door in a longitudinal direction of the vehicle at the initial stage of opening of the rear door and the last stage of closing of the rear door.

14 Claims, 20 Drawing Sheets

(56) References Cited

U.S. PATENT DOCUMENTS

| | | | | |
|---|---|---|---|---|
| 5,632,065 A | * | 5/1997 | Siladke | B60J 5/0479 |
| | | | | 16/335 |
| 2005/0134084 A1 | * | 6/2005 | Rangnekar | E05D 3/127 |
| | | | | 296/146.11 |
| 2006/0197359 A1 | * | 9/2006 | Yamasaki | B60J 5/042 |
| | | | | 296/187.09 |
| 2008/0040888 A1 | * | 2/2008 | Nichols | E05D 3/127 |
| | | | | 16/366 |
| 2009/0070960 A1 | * | 3/2009 | Elliott | E05D 3/127 |
| | | | | 16/334 |
| 2009/0072582 A1 | * | 3/2009 | Elliott | E05C 17/203 |
| | | | | 296/146.11 |
| 2009/0178241 A1 | * | 7/2009 | Fain | E05D 3/127 |
| | | | | 16/334 |
| 2013/0042435 A1 | * | 2/2013 | Schott | E05D 5/062 |
| | | | | 16/321 |
| 2016/0362921 A1 | * | 12/2016 | Dey | E05D 11/1014 |
| 2016/0362926 A1 | * | 12/2016 | Dey | E05D 11/1014 |
| 2017/0030126 A1 | * | 2/2017 | Elie | E05F 15/614 |

* cited by examiner

COACH DOOR OF VEHICLE OPENABLE AND CLOSABLE REGARDLESS OF ORDER

CROSS-REFERENCE TO RELATED APPLICATIONS

This application claims priority to Korean Patent Application No. 10-2017-0115938, filed on Sep. 11, 2017, which is incorporated herein by reference in its entirety.

BACKGROUND

Field of the Invention

The present invention relates to a coach door of a vehicle in which opening directions of a front door and a rear door are different from each other, and more particularly, to a coach door of a vehicle openable/closable regardless of an order which prevents a front door and a rear door from interfering with each other during an opening/closing process.

Description of Related Art

Various styles have been developed for vehicle doors such as a swing door in which a hinge shaft is arranged in a vertical direction of the vehicle and is rotated in parallel with a ground surface. In some vehicles, a coach door is adopted, which the sense of openness is greater when the door is opened. The coach doors are installed with opening/closing directions of a front door and a rear door being different from each other and an opening/closing order of the coach door is determined in advance. In other words, one example of the coach door applied to a vehicle 100 is illustrated in FIG. 1. A hinge shaft of a front door 110 is installed at a front end of the front door and the hinge shaft of a rear door 220 is installed at a rear end of the rear door 220. A latch L for maintaining locking states of the front door 110 and the rear door 220 is installed at one side of the front door 110 or the rear door 220 of the coach door.

Further, as illustrated in FIG. 2, a sealing S for airtightness is disposed between the rear end of the front door 110 and the front end of the rear door 220. However, the opposite swing door illustrated in FIG. 1 has a problem in that the opening and closing order of the front door 110 and the rear door 220 is preset, and thus, the rear door 220 is unable to be opened alone. In other words, to open the rear door 220, the front door 110 needs to be first opened, and thus, the rear door 220 is unable to be opened or closed by itself. For example, when the door is opened, the front door 110 is opened and then the rear door 220 is opened. When the door is closed, the rear door 220 is closed and then the front door 110 needs to be closed.

Meanwhile, as illustrated in FIGS. 3 and 4, when a center pillar 230 is installed between the front door 210 and the rear door 220 in a vehicle 200, the rear door 220 is capable of being opened/closed independently from the front door 210, the front door 210 and the rear door 220 may be opened regardless of an order. However, by application of the center pillar 230, the sense of openness deteriorates and an entrance and exit of occupants in the vehicle becomes less convenient, and as a result, an advantage of the coach door is offset.

SUMMARY

The present invention provides a coach door of a vehicle, which is openable/closable regardless of an order, in which a rear door is opened/closed independently from a front door in a vehicle to which a center pillar is not applied.

In accordance with an exemplary embodiment of the present invention, a coach door of a vehicle openable/closable regardless of an order having a front door in which a hinge axis connected to a vehicle body is installed at a front end and a rear door in which the hinge axis connected to the vehicle body is installed at a rear end, may include: a hinge assembly having a first hinge hinged to a vehicle body, a second hinge hinged to the first hinge and engaged with a rear end of a rear door, an opening start device configured to rotate the rear end of the rear door to the outside of the vehicle at an early stage of opening of the rear door, and a closing end device configured to rotate the rear end of the rear door to the inside of the vehicle at a last stage of closing of the rear door; and a guide unit configured to guide a front end of the rear door to cause the front end of the rear door to move in a longitudinal direction of the vehicle at the initial stage of opening of the rear door and the last stage of closing of the rear door.

The opening start device may be an actuator installed in a compressed state and configured to move the first hinge to the outside. In the actuator, a piston may be inserted into a cylinder and a spring installed in the cylinder in the compressed state may elastically support the piston. The closing end device may be a driving motor, a driving gear rotated by the driving motor, and a sector gear engaged integrally with the first hinge and engaged to the driving gear. The driving gear may be a unidirectional rotary gear configured to transmit rotational force from the driving motor only the sector gear.

The opening start device may be connected to the first hinge on the inner side of the vehicle other than a virtual line that connects a portion where the first hinge is connected to the vehicle body and a portion where the first hinge and the second hinge are connected. The first hinge may be curved inward of the vehicle. The guide unit may include a guide pin bracket installed at the front end of the rear door and having a guide pin formed at the end, and a guide having a guide groove configured to guide the guide pin in a longitudinal direction of the vehicle and installed at a vehicle side adjacent to the front end of the rear door when the rear door is completely closed. The guide groove may be formed to accommodate the guide pin. In the guide groove, the end at the rear side of the vehicle may be formed to be opened to the outside of the vehicle.

An opened portion in the guide groove may be formed with a width that decreases from the outside to the inside. The guide pin bracket may be installed at each of an upper end and a lower end of the front end of the rear door, and the guide may be installed at each portion adjacent to the guide pin bracket in the vehicle body when the rear door is closed. The guide unit may further include a switch configured to operate the closing end device by detecting completion of first-stage closing of the rear door, which is a state in which the rear door fully rotates around the second hinge.

A center pillar may not be installed at a portion where the rear end of the front door and the front end of the rear door contact in the vehicle. According to a coach door of a vehicle, which is openable/closable regardless of an order of the present invention configured as such, in a vehicle to which a center pillar is not applied and a coach door is applied, a rear door may be opened/closed independently from a front door. As a result, since the front door and the rear door may be opened/closed regardless of the order, the sense of openness may be secured while entry and exit of occupants become convenient.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
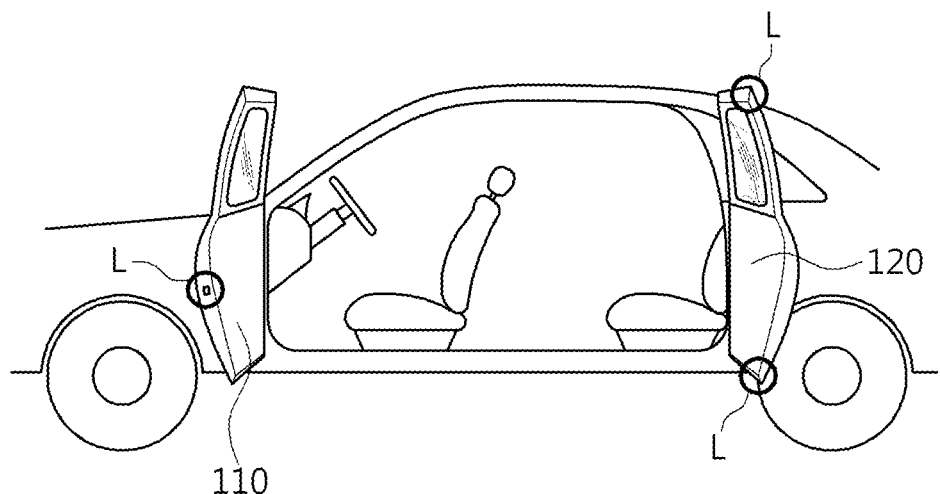
FIG. 1 is a side view illustrating a vehicle to which a coach door is applied according to one example of the related art.
Figure 2:
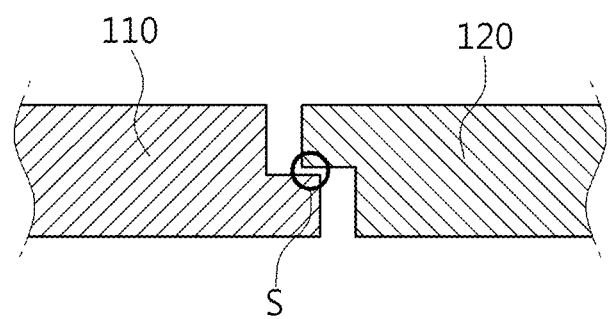
FIG. 2 is a cross-sectional view illustrating a portion where a front door and a rear door contact in the vehicle of FIG. 1 according to the related art.
Figure 3:
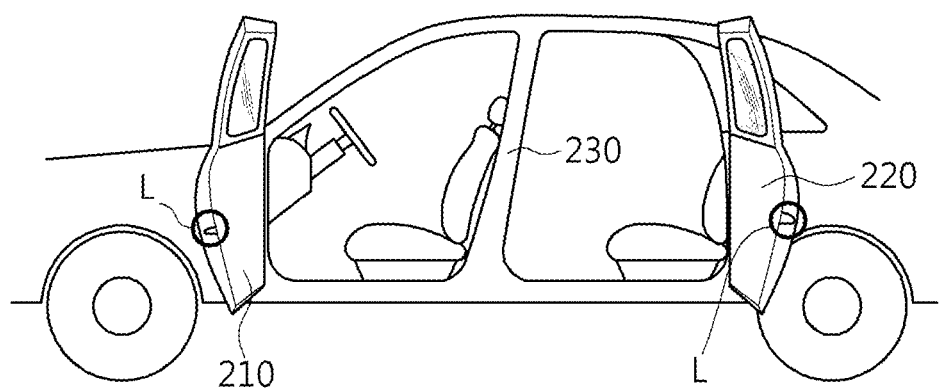
FIG. 3 is a side view illustrating a vehicle to which a coach door is applied according to another example of the related art.
Figure 4:
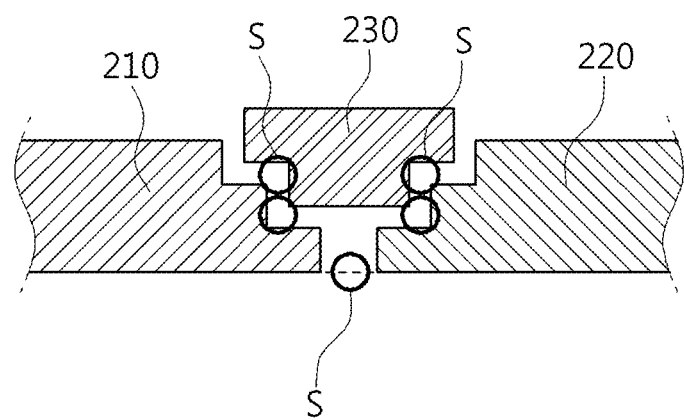
FIG. 4 is a cross-sectional view illustrating the portion where the front door and the rear door contact in the vehicle of FIG. 3 according to the related art.
Figure 5:
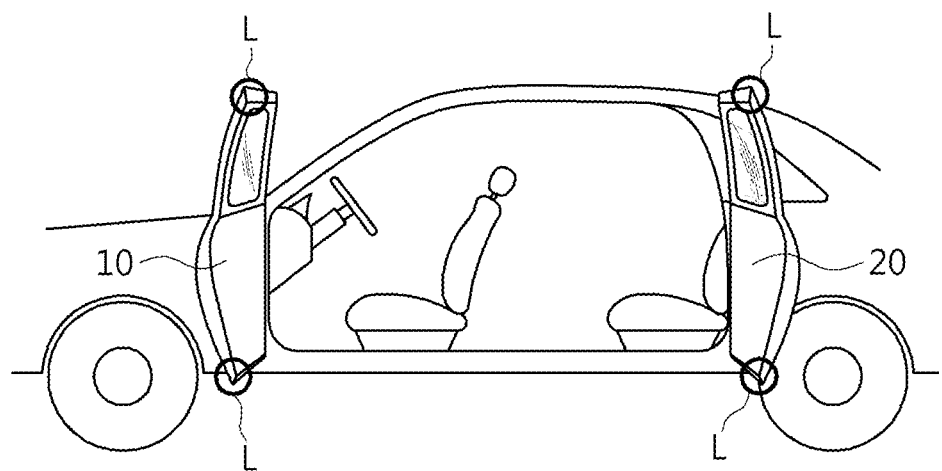
FIG. 5 is a side view illustrating a vehicle to which a coach door of a vehicle, which is openable/closable regardless of an order and a cross-sectional view illustrating a portion where a front door and a rear door contact each other according to an exemplary embodiment of the present invention.
Figure 5:
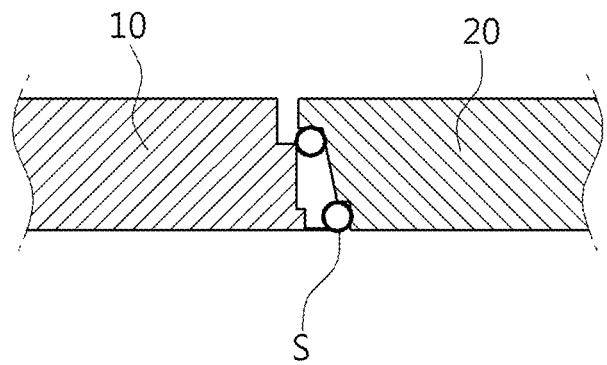
Figure 6:
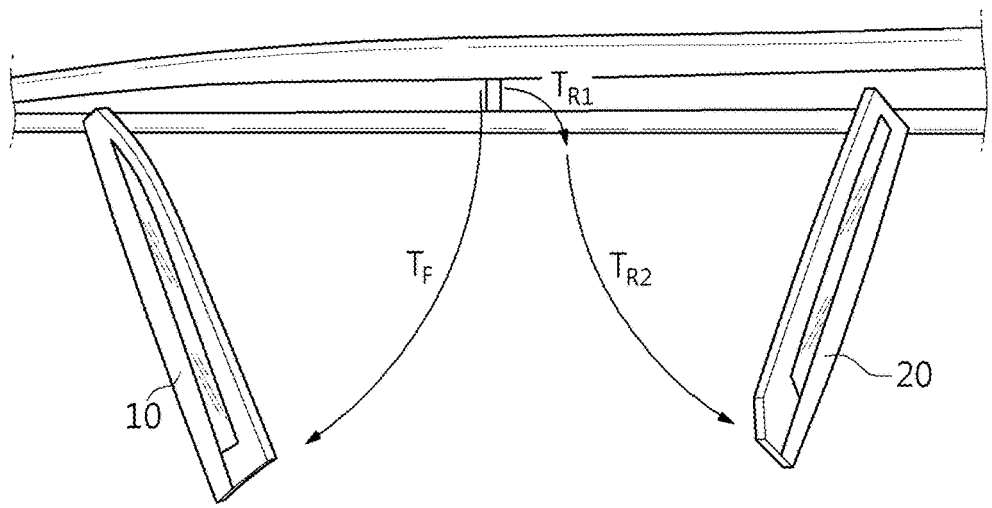
FIG. 6 is a plan view illustrating a trajectory when the front door and the rear door are opened in the coach door of a vehicle, which is openable/closable regardless of an order according to an exemplary embodiment of the present invention.
Figure 7:
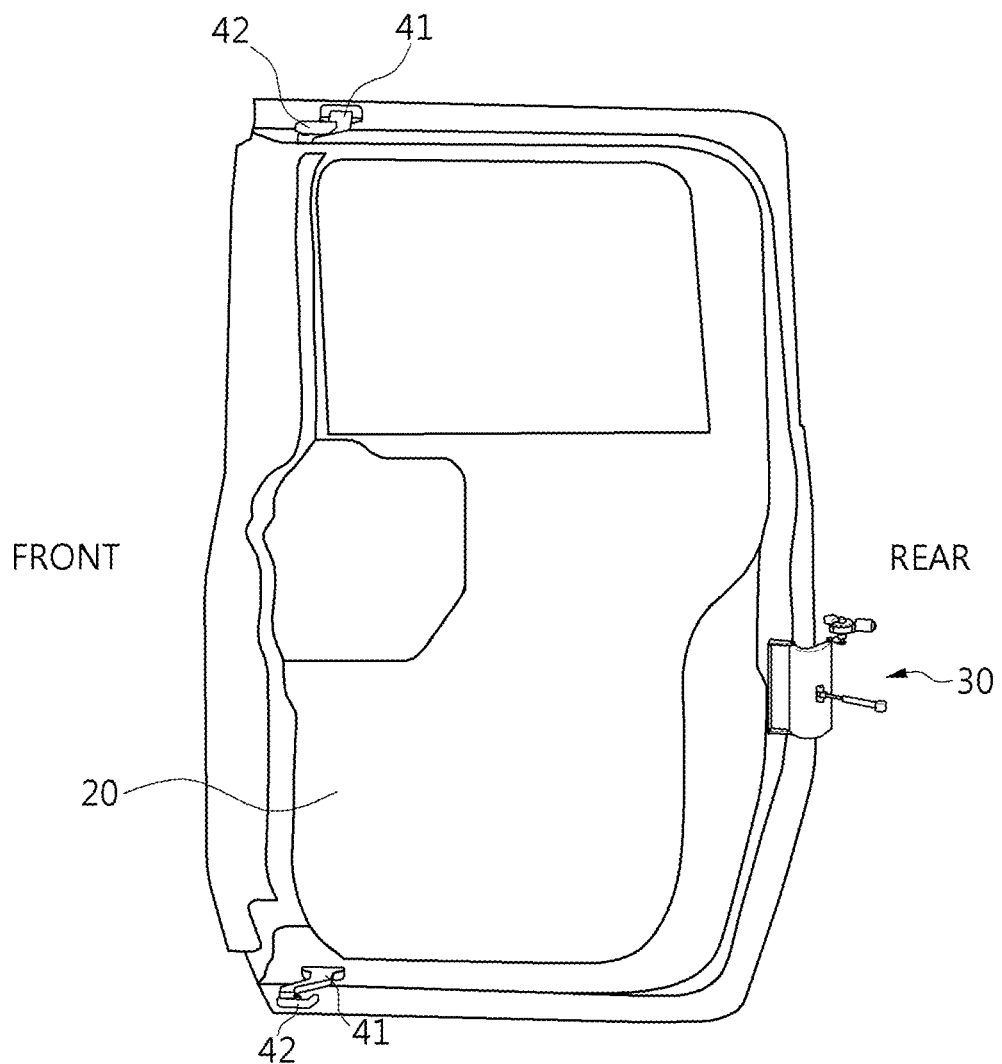
FIG. 7 is a perspective view illustrating a state in which a hinge assembly and a guide unit are mounted on the rear door in the coach door of a vehicle, which is openable/closable regardless of an order according to an exemplary embodiment of the present invention.
Figure 8:
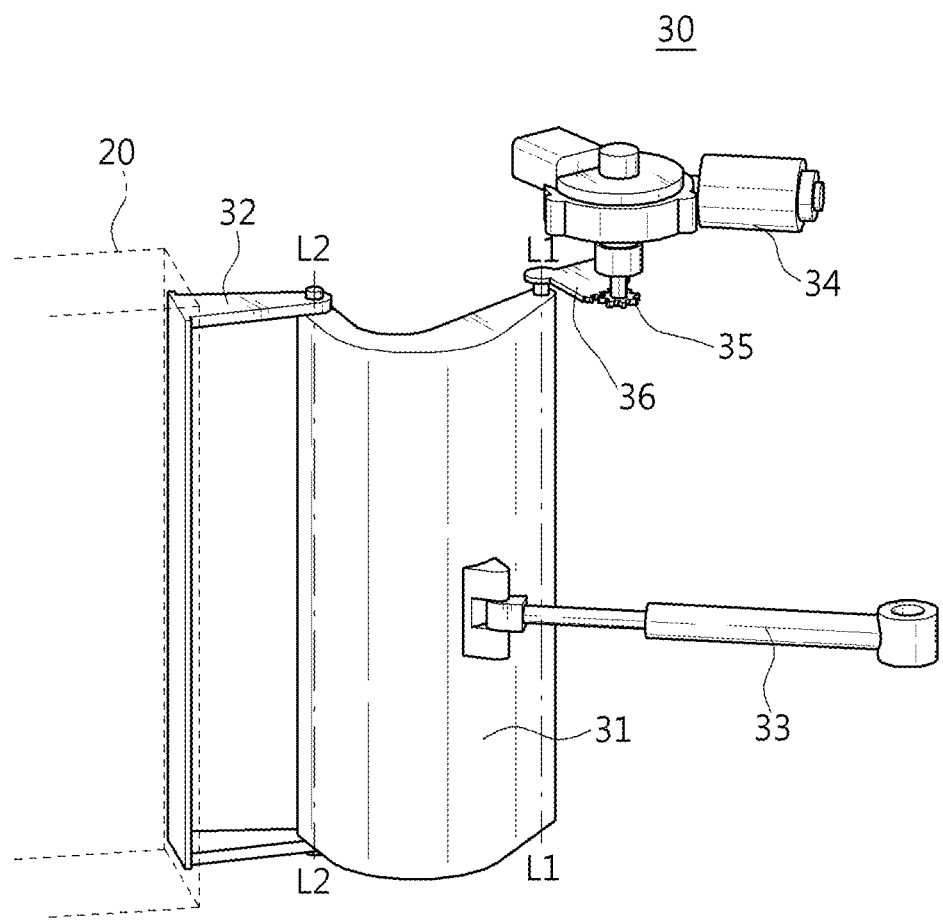
FIG. 8 is a perspective view illustrating the hinge assembly in the coach door of a vehicle, which is openable/closable regardless of an order according to an exemplary embodiment of the present invention.
Figure 9A:
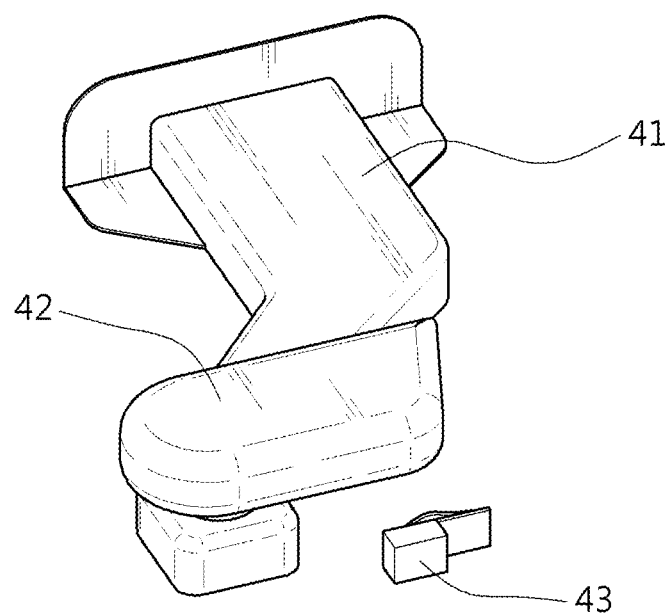
FIGS. 9A to 9D are diagrams illustrating the guide unit in the coach door of a vehicle, which is openable/closable regardless of an order according to an exemplary embodiment of the present invention.
Figure 9B:
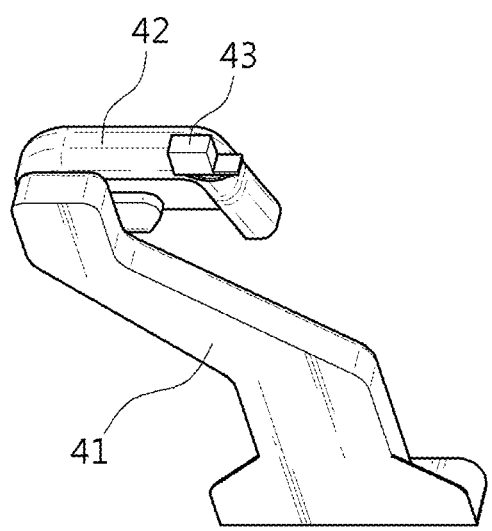
Figure 9C:
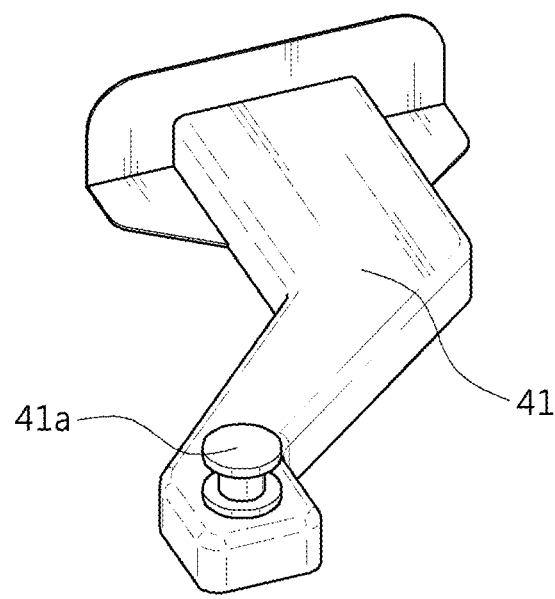
Figure 9D:
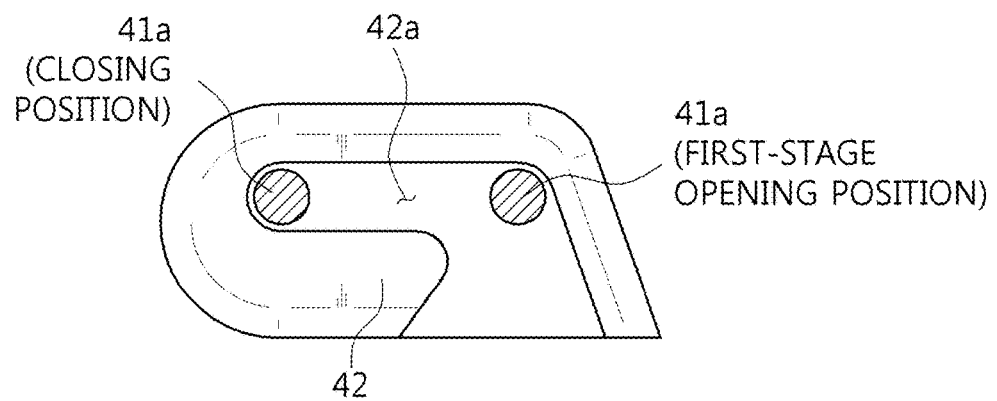

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Hereinafter, a coach door of a vehicle, which is openable/closable regardless of an order according to the present invention will be described in detail with reference to the accompanying drawings.

The coach door of a vehicle, which is openable/closable regardless of an order according to the present invention may include a hinge assembly 30 having a first hinge 31 hinged to a vehicle body, a second hinge 32 hinged to the first hinge 31 and engaged with a rear end of a rear door 20, an opening start device configured to rotate the rear end of the rear door 20 to the outside of the vehicle at an early stage of opening of the rear door 20, and a closing end device configured to rotate the rear end of the rear door 20 to the inside of the vehicle at a last stage of closing of the rear door 20, and a guide unit configured to guide a front end of the rear door 20 to cause the front end of the rear door to move in a longitudinal direction of the vehicle at the initial stage of opening of the rear door 20 and the last stage of closing of the rear door 20.

While the coach door in which the front door 10 and the rear door 20 are opened and closed in different directions, the rear door 20 partially moves to a rear side of the vehicle in a vehicle 1 without a center pillar and thereafter, rotates to be opened, and as a result, the rear door 20 may be opened irrespective of the front door 10. While the coach door in which the front end of the front door 10 is hinged to a vehicle body and the rear end of the rear door 20 is hinged to the vehicle body to open and close the front door 10 and the rear door 20 in different directions is applied, in the vehicle without the center pillar, the rear door 20 may be opened after the front door 10 is opened and after the rear door 20 is first closed, the front door 10 may be closed.

However, in the present invention, the opening or closing operation of the rear door 20 is executed in two stages to enable the rear door 20 to be opened and closed irrespective of the front door 10. In other words, when the rear door 20 is opened, the rear door 20 partially moves to the rear side of the vehicle and thereafter, rotates to be opened, and as a result, the rear door 20 may be opened irrespective of the front door 10. When the rear door 20 is closed, the rear door 20 moves to the front side of the vehicle at the last stage of a closing operation after rotating to dispose the front end of the rear door 20 in contact with the rear end of the front door 10.

Meanwhile, when the front door 10 is opened, the front door 10 may be opened or closed in two stages similar to the rear door 20. However, it will be described that the rear door 20 is opened or closed in two stages for easy description. The hinge assembly 30 may be configured to guide the movement of the rear end of the rear door 20 to open or close the rear door 20 in two stages. The hinge assembly 30 may include a first hinge 31 hinged to the vehicle body, a second hinge 32 hinged to the first hinge and engaged to the rear side of the rear door 20, an opening start device configured to slide the rear door 20 to the rear side of the vehicle at the early stage of the opening of the rear door 20, and a closing end device configured to move the rear door 20 to the front side of the vehicle at the last stage of the rear door 20.

The opening start device may be an actuator 33 installed in a compressed state and the closing end device may be a driving motor 34. The first hinge 31 may be rotatably installed in the vehicle body of the vehicle. The first hinge 31 may be curved inward of the vehicle. Accordingly, the first hinge 31 may be engaged with the actuator 33 to be described later and to be connected to the actuator 33 on the inner side of the vehicle other than both ends of the first hinge 31, and as a result, acting force of the actuator 33 may be applied to the first hinge 31 more smoothly.

The second hinge 32 may be hinged to the end of the first hinge 31 and the rear end of the rear door 20 may be engaged to the opposite side of a hinge connection portion with the first hinge 31. The first hinge 31 may be hinged directly to the vehicle body and the second hinge 32 may be hinged to the first hinge 31 again. Therefore, the first hinge 31 may be configured to rotate around a first hinge axis L1 and the second hinge 32 may be configured to rotate around a second hinge axis L2. Since the rear door 20 is not directly connected to the first hinge 31, but hinged through the second hinge 32, the rear door 20 may be operated in two stages when the rear door 20 is opened or closed.

Accordingly, the front door 10 may be opened and closed with a simple trajectory $T_F$, whereas it is differently illustrated that the rear door 20 has a trajectory $T_{R1}$ at the initial stage of opening and the subsequent trajectory $T_{R2}$. The initial trajectory $T_{R1}$ of the rear door 20 may be a trajectory that appears when the rear door 20 rotates with respect to the first hinge 31 and the trajectory $T_{R2}$ of the remaining section appears when the rear door 20 rotates with respect to the second hinge 32.

Furthermore, a first end of the actuator 33 may be connected to the vehicle body and a second end may be connected to the first hinge 31. The actuator 33 may be operated to rotate the first hinge 31 when the rear door 20 is opened. The actuator 33 may be installed between the vehicle body and the first hinge 31 to rotate the first hinge 31 when the actuator 33 is extended when no external force is applied. For example, the actuator 33 has a configuration in which a piston is slidably installed in a cylinder, and a spring for elastically supporting the piston to push the piston into the cylinder is installed. Therefore, the actuator 33 may be configured to rotate the first hinge 31 while extending in the state where no external force is applied.

The actuator 33 may be connected with the first hinge 31 on the inner side of the vehicle from the first hinge 31 other than a virtual line that connects a portion bent inward in the vehicle from the first hinge 31, that is, a portion where the first hinge 31 is connected to the vehicle body and a portion where the first hinge 31 and the second hinge 32 are connected. When power is applied, the driving motor 34 may be configured to output rotational force. The driving motor 34 may not be operated when the rear door 20 is opened and operated when the rear door 20 is closed. In particular, the rear door 20 may be configured to operate after first-stage closing is completed and the rear door 20 may be configured to operate while second-stage closing is performed.

A driving gear 35 may be rotated by the driving motor 34. In particular, the driving gear 35 may be configured to transmit the rotational force only in one direction. For example, the driving gear 35 may be applied as a unidirectional rotary gear and thus, even when the first hinge 31 rotates while the rear door 20 is opened, the rotational force may be prevented from being transmitted to the driving motor 34 and the rotational force may be transmitted from the driving motor 34 to the first hinge 31 only when the rear door 20 is closed.

A sector gear 36 may be installed integrally with the first hinge 31. A rotary axis of the sector gear 36 may become the rotary axis of the first hinge 31, that is, the first hinge axis L1 and the sector gear 36 may be formed integrally with the first hinge 31 to rotate together with the first hinge 31. Since the rear door 20 may be configured to rotate within a predetermined angular range and a space or cavity in which the hinge assembly 30 may be installed in the vehicle body is narrow, the sector gear 36 may be formed with a gear formed only along a periphery.

Further, the guide unit may include a guide pin bracket 41 disposed at the front end of the rear door 20, a guide 42 mounted on the vehicle body of the vehicle, and a switch 43 operated by the guide pin bracket 41. The guide unit may be configured to guide the front end of the rear door 20 to slide in the longitudinal direction of the vehicle at the initial stage of the opening and the last stage of the closing of the rear door 20. The guide pin bracket 41 may be installed on the front end side of the rear door 20 to protrude inward in a vehicle width direction. A guide pin 41a may be formed at an end of the guide pin bracket 41. The guide pin 41a may be inserted into a guide 42 to be described later to guide the sliding of the rear door 20 at the initial stage of the opening (e.g., first-stage opening) of the rear door 20 or the last stage of the closing (e.g., second-stage opening) of the rear door 20.

In addition, the guide 42 may be installed in the vehicle body. When the rear door 20 is completely closed, the guide 42 may be installed at a position adjacent to the upper end and the lower end of the front end side of the rear door 20. A guide groove 42a may be formed in the guide 42, which is formed in the longitudinal direction of the vehicle and accommodates the guide pin 41a. An entrance may be formed in the guide groove 42a in the width direction of the vehicle to allow the guide pin 41a to be taken in and out when the rear door 20 is opened or closed in the first-stage opening or the first-stage closing. In particular, an outer width of the entrance may be formed to be of a larger size, and a result, the guide pin 41a may enter the entrance more easily.

switch 43 may be disposed on the vehicle body and when the rear door is closed at the first stage, it may be possible to detect the first-stage closing completion of the rear door.

When the rear door 20 is closed at the first stage, the guide pin 41a may enter the guide groove 42a and the switch 43 may be configured to detect the entrance of the guide pin 41a to generate an output signal. When the first-stage closing of the rear door 20 is detected by the switch 43, a controller may be configured to apply the power to the driving motor 34 for the second-stage closing to operate the driving motor 34. The guide unit may be disposed at each of the upper end and the lower end of the front end of the rear door 20. In other words, the guide pin bracket 41 may be disposed at each of the upper end and the lower end of the front end of the rear door 20 and the guide 42 may be installed at the corresponding position in the vehicle body.

Figure 10:
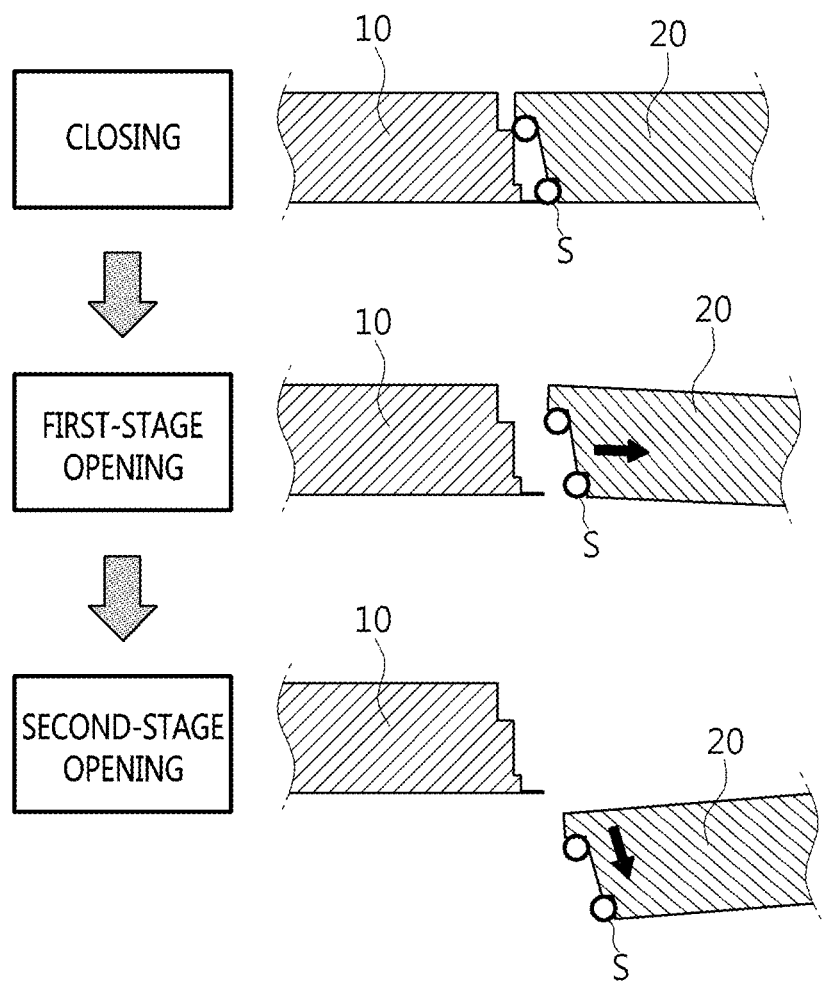
FIG. 10 is a cross-sectional view illustrating an operation of the rear door when the rear door is opened in the coach door of a vehicle, which is openable/closable regardless of an order according to an exemplary embodiment of the present invention.
Figure 11:
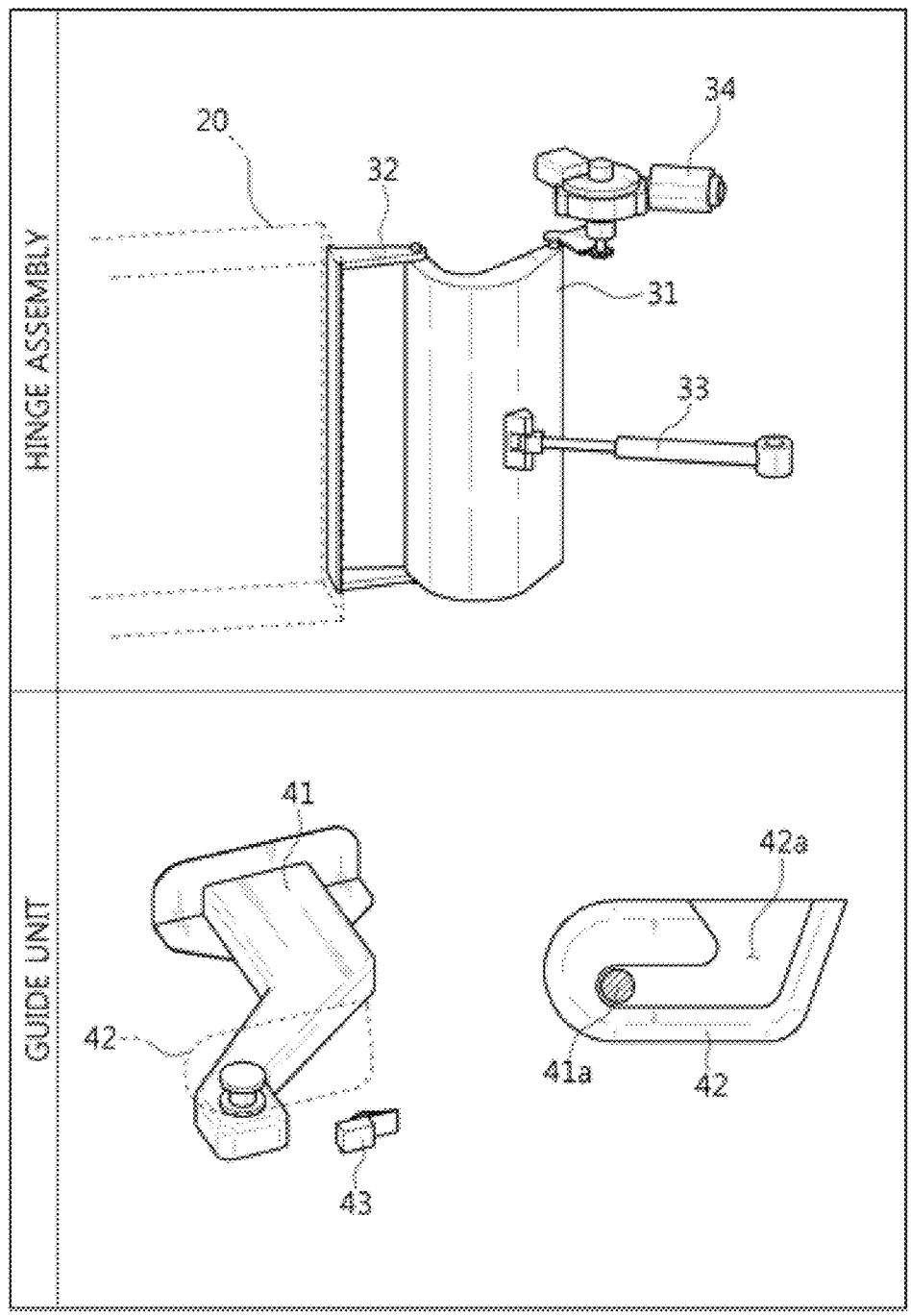
FIGS. 11 to 13 are diagrams illustrating states of the hinge assembly and the guide unit when the rear door is opened in the coach door of a vehicle, which is openable/closable regardless of an order according to an exemplary embodiment of the present invention.
Figure 12:
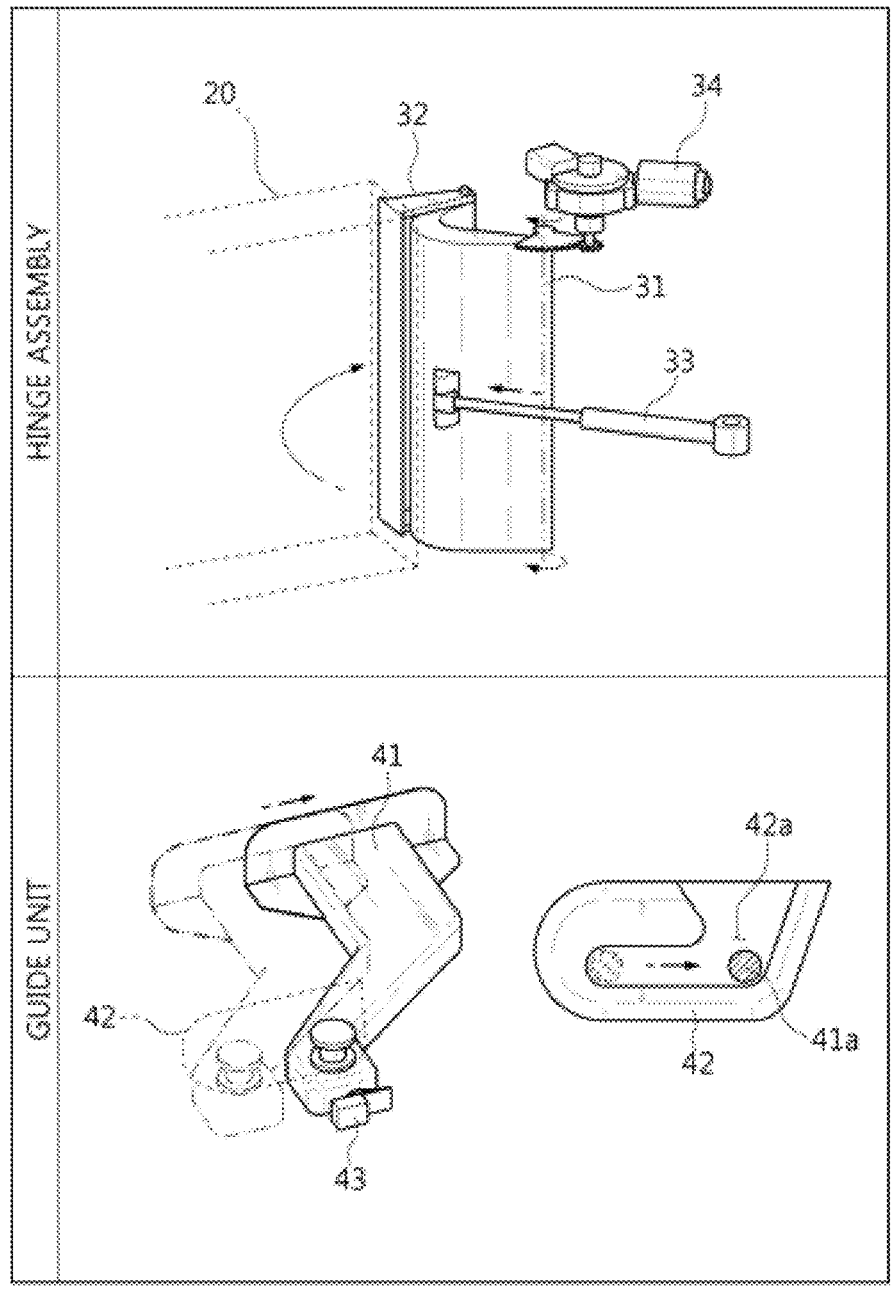

An operation of the coach door of a vehicle, which is openable/closable regardless of an order according to the present invention configured as such will be described below. FIG. 10 illustrates a state at the time of the initial opening of the rear door 20. In the closed state of the rear door 20, the rear door 20 may be opened rearwardly at the first stage and separated from the front door 10, and then opened in the second stage by rotation. This will be described below in detail with reference to FIGS. 11 to 13.

When the door handle is operated to open the rear door 20 in the closed state (see FIG. 11), the actuator 33 may be activated. When the actuator 33 is activated, the first hinge 31 may be rotated with respect to the first hinge axis L1 to move the first hinge 31 from a closing position to a first-stage opening position in a rear direction of the vehicle (see FIG. 12).

The front end of the rear door 20 may slide in the rear direction of the vehicle by the guide pin 41a and the rear end of the rear door 20 may be configured to rotate to the outside of the vehicle around the first hinge axis L1 when the first hinge 31 moves from the closing position to the first-stage opening position. In particular, since the front end of the rear door 20 is in a state where the guide pin 41a is constrained to the guide groove 42a and the length of the first hinge 31 is less than the length of the rear door 20, the overall movement of the rear door 20 may be shifted to the rear of the vehicle by a predetermined distance (e.g., approximately the length of the guide groove) and the rear end of the rear door 20 may move to the outside of the vehicle. Particularly, the guide pin 41a may be configured to move toward the entrance of the guide groove 42a.

Figure 13:
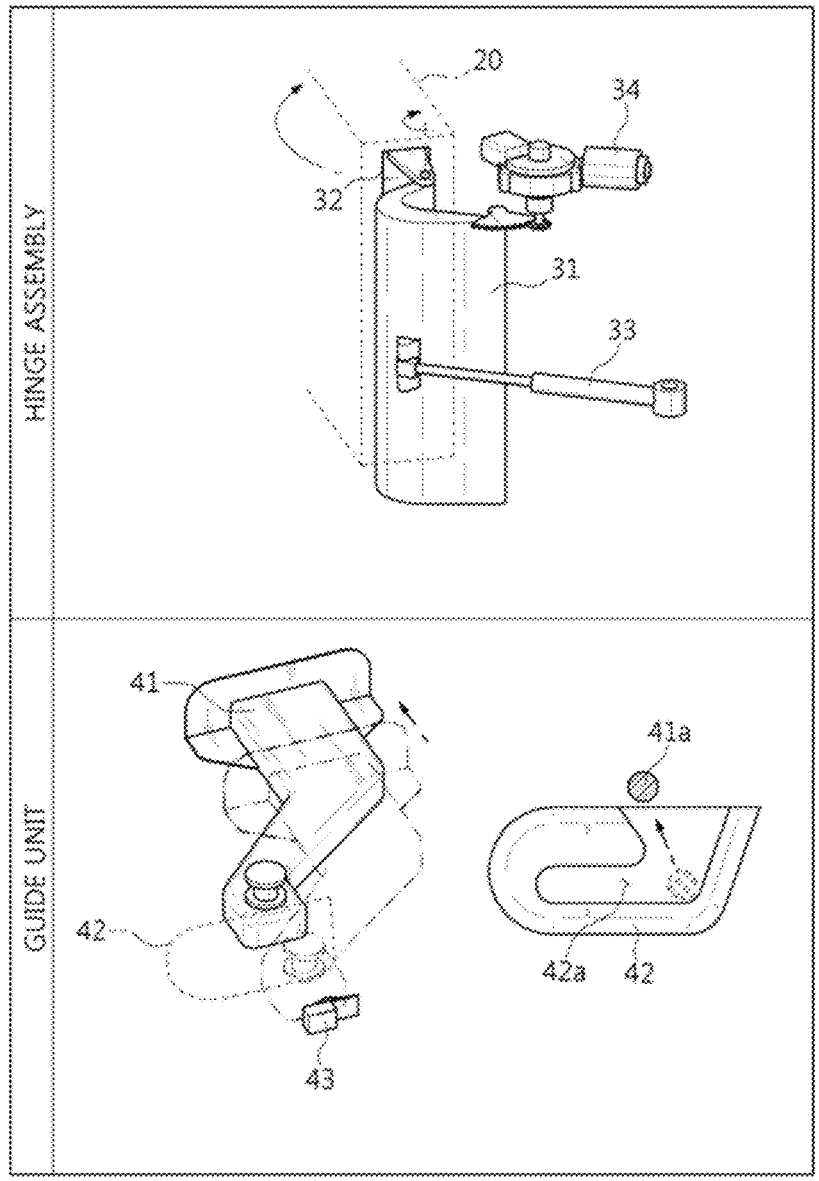

Accordingly, since the rear door 20 moves to the rear of the vehicle, the front end of the rear door 20 may be separated from the front end of the front door 10. When the rear door 20 is completely opened in the first stage, the rear door 20 may be rotated by the operation of the occupant, as illustrated in FIG. 13, and thus the rear door 20 may be opened. In particular, the guide pin 41a may be released to the outside through the entrance of the guide groove 42a. Accordingly, by opening the rear door 20 in the first stage and separating the rear door 20 from the front door 10, the rear door 20 may be opened at the second stage by operation force of the occupant, the rear door 20 may be opened regardless of the front door 10.

Figure 14:
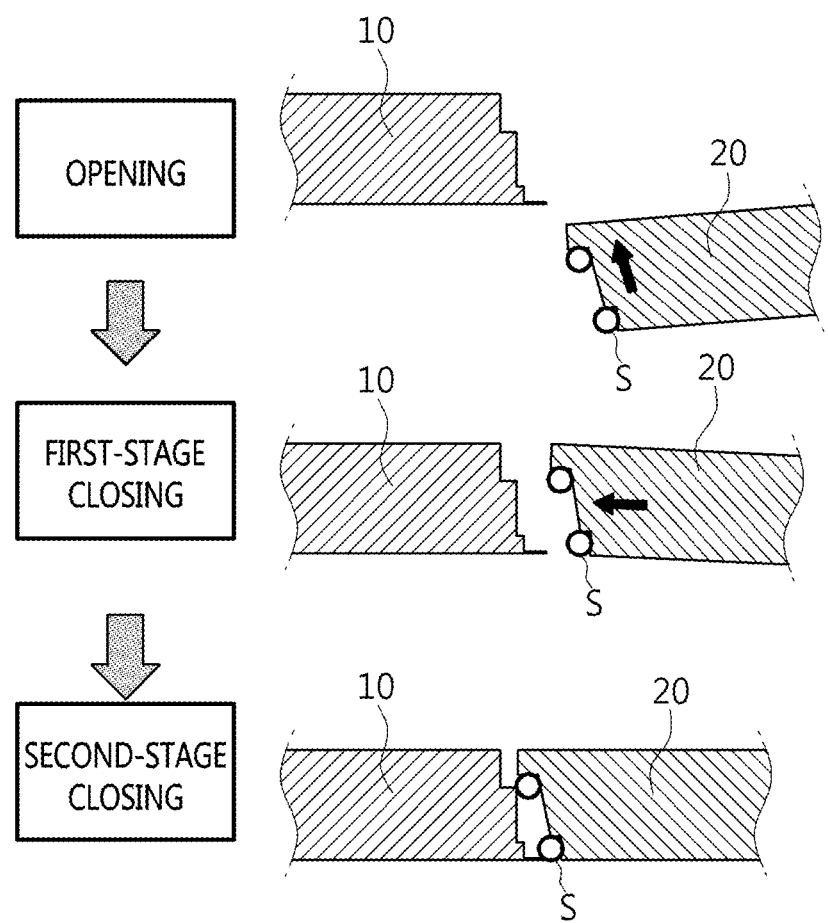
FIG. 14 is a cross-sectional view illustrating the operation of the rear door when the rear door is closed in the coach door of a vehicle, which is openable/closable regardless of an order according to an exemplary embodiment of the present invention.
Figure 15:
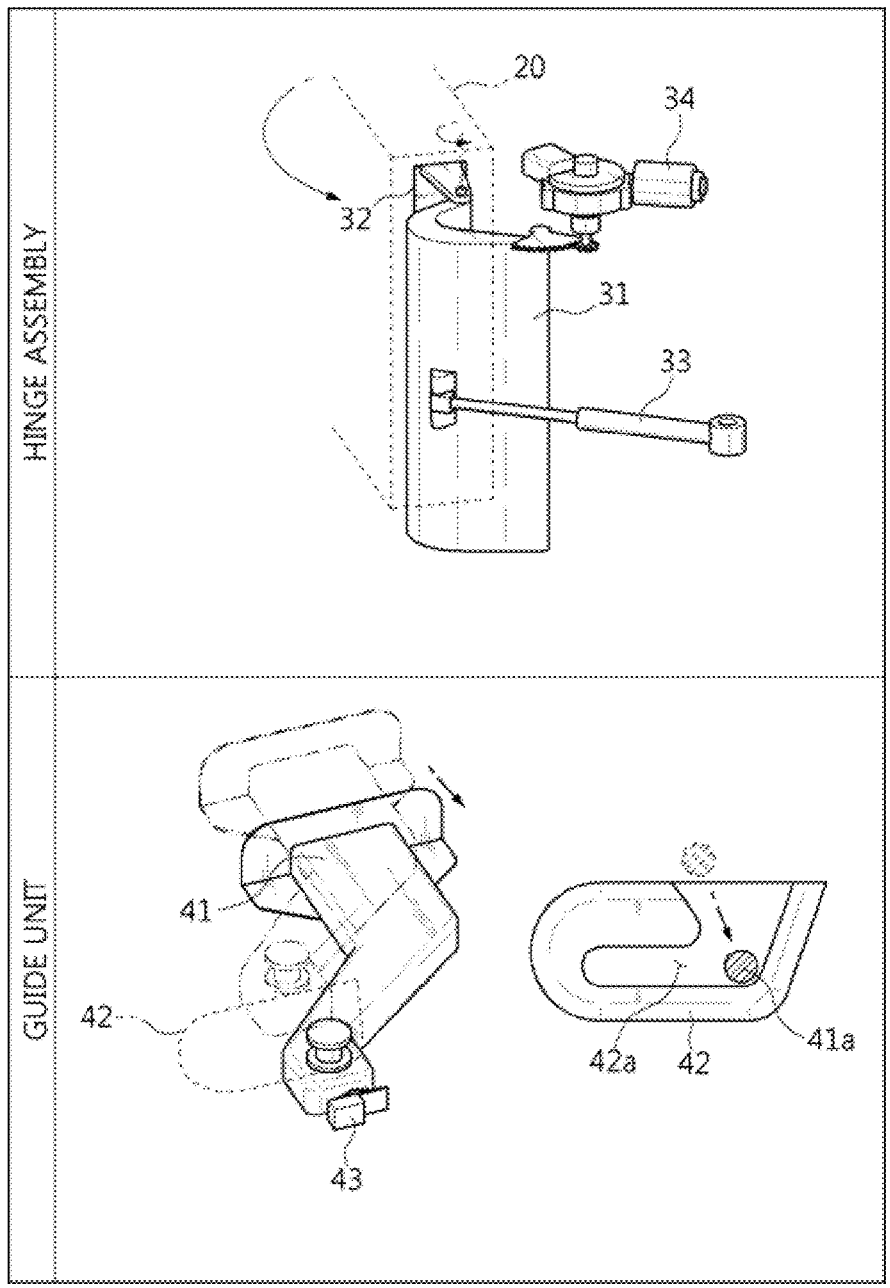
FIGS. 15 to 17 are diagrams illustrating the states of the hinge assembly and the guide unit when the rear door is closed in the coach door of a vehicle, which is openable/closable regardless of an order according to an exemplary embodiment of the present invention.

FIG. 14 illustrates a portion where the rear door 20 and the front door 10 contact each other when the rear door 20 is closed. When the rear door 20 is closed, the rear door 20 may be closed at the first stage to align the rear door 20 with the vehicle body. The front end of the rear door 20 may then be closed at the second stage while sliding to closely contact the rear end of the front door 10, and as a result, the rear door 20 may be completely closed. FIG. 15 illustrates a state in which the rear door 20 is completely opened.

The rear door 20 may be rotated by the operation force of the occupant to be closed at the first stage. In other words, when the occupant closes the rear door 20, the rear door 20 may be configured to rotate around the second hinge axis L2, and the guide pin 41a, disposed on the front end side of the rear door 20, then enters the inside of the guide groove 42a again. Since only the rear end of the rear door 20 is restricted by the second hinge 32 when the rear door 20 is fully opened, the second door may be configured to rotate around the second hinge axis, and as a result, the front end of the rear door 20 may be configured to move toward the guide 42. Further, the entrance of the guide groove 42a is wide on the outside, the guide pin 41a may thus be inserted into the guide groove 42a.

Figure 16:
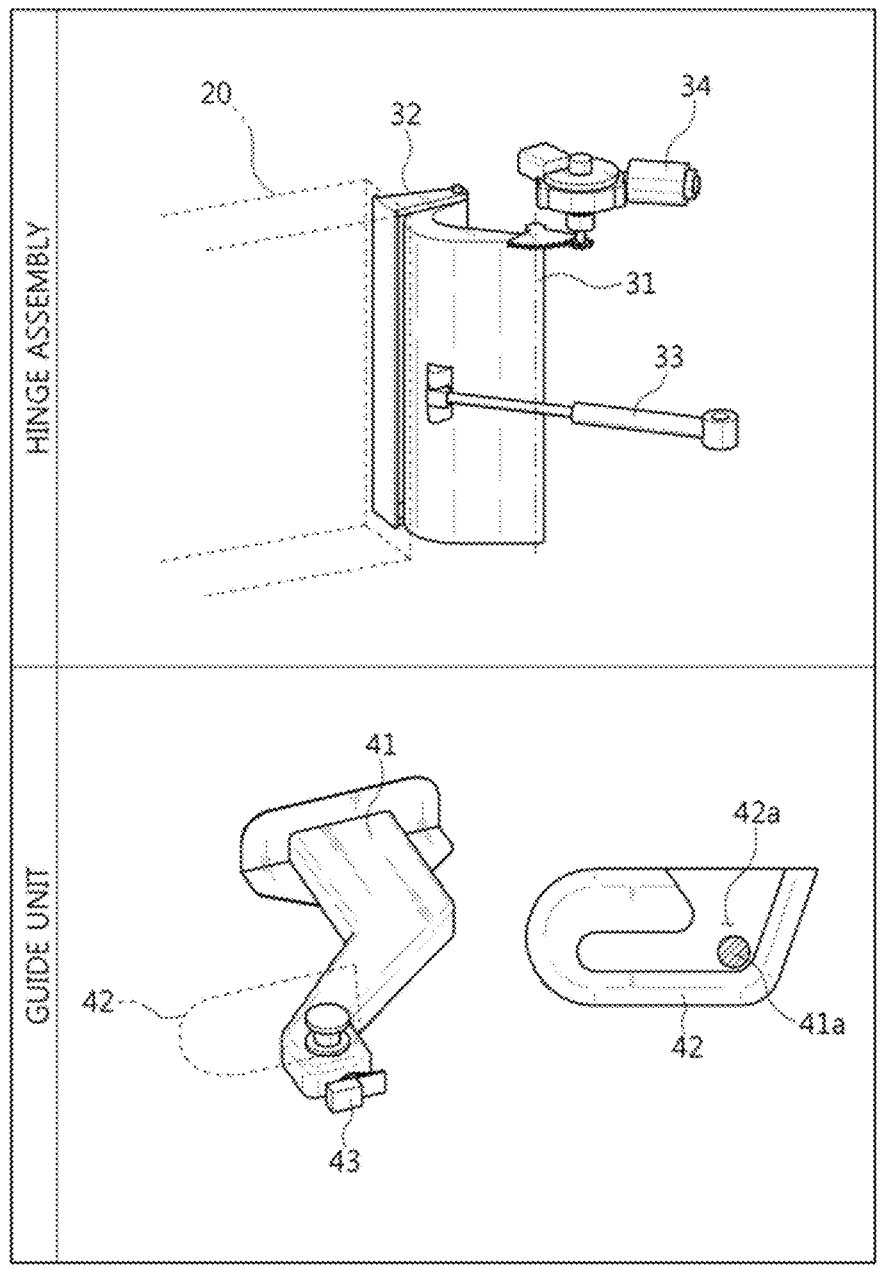

As illustrated in FIG. 16, when the first-stage closing of the rear door 20 which is a state in which the rear door 20 fully rotates around the second hinge 32 is completed, the guide pin 41a may be positioned in a straight section of the guide groove 42a and the end of the guide pin bracket 41 may be adjacent to or in contact with the switch 43. Accordingly, when the switch 43 detects that the first-stage closing of the rear door 20 is completed, the driving motor 34 may be activated.

Figure 17:
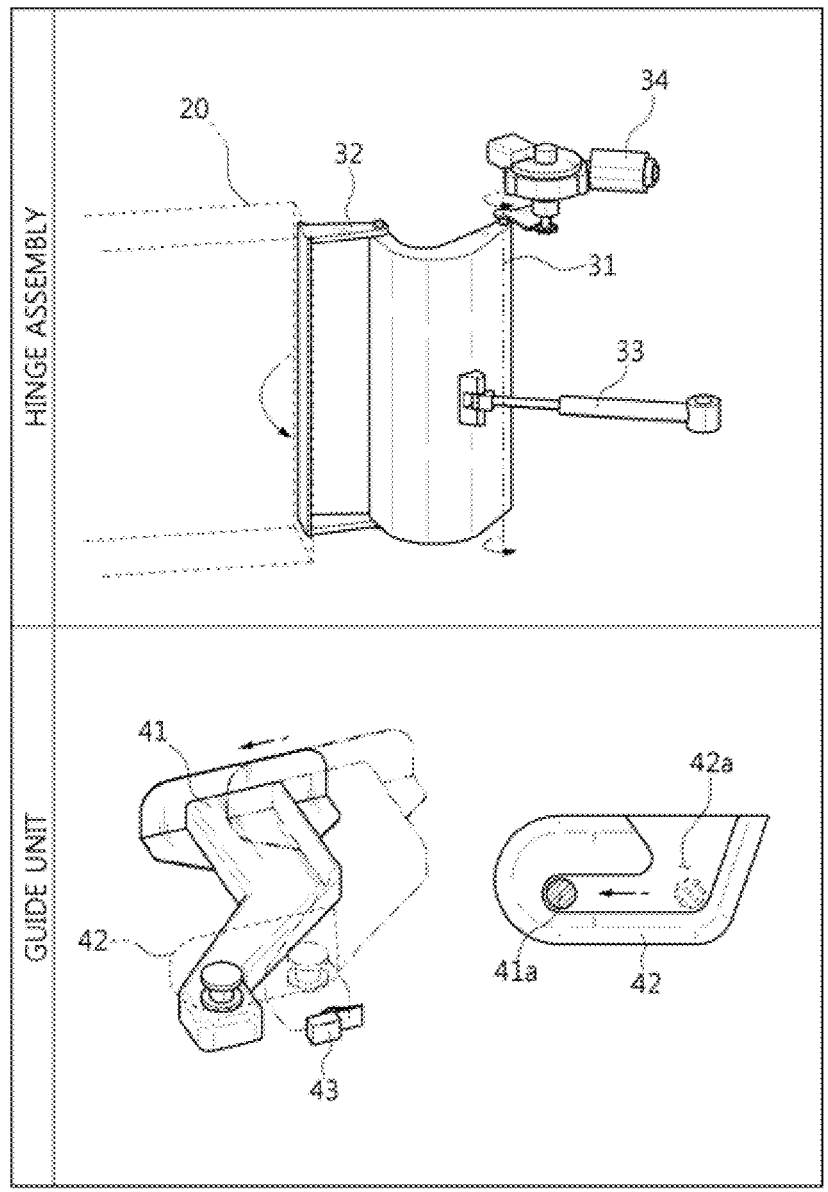

As illustrated in FIG. 17, when the drive motor 34 is operated, the drive gear 35 may be configured to rotate the sector gear 36 to rotate the first hinge 31 in the direction opposite to the opening direction. When the first hinge 31 rotates around the first hinge axis L1, while the second hinge axis L2 rotates around the first hinge axis L1, the second hinge axis L2 may be configured to rotate the second hinge 32. Since the force by which the driving motor 34 rotates the first hinge 31 is greater than the force by which the actuator 33 rotates the first hinge 31 in the opposite direction, the first hinge 31 may be rotated to close the rear door 20.

In particular, while the guide pin 41a moves in the longitudinal direction of the vehicle along the guide groove 42a, the front end of the rear door 20 closely contacts the front end of the front door 10 to be closed at the second stage, and as a result, the rear door 20 may be completely closed. When the rear door 20 is completely closed, the front end of the rear door 20 may be positioned on the inner side of the rear end of the front door 10. Further, the front door 10 and the rear door 20 may be fixed to each other by a latch L disposed on the front door 10 and the rear door 20 and a space between the front door 10 and the rear door 20 may be sealed by a sealing S installed between the rear end of the front door 10 and the front end of the rear door 20. Accordingly, in the claimed invention the doors are not dependent upon a particular sequential closing or opening order.

What is claimed is:

1. A coach door of a vehicle openable/closable regardless of an order, which includes a front door in which a hinge axis connected to a vehicle body is installed at a front end and a rear door in which the hinge axis connected to the vehicle body is installed at a rear end, comprising:

a hinge assembly having a first hinge hinged to a vehicle body, a second hinge hinged to the first hinge and engaged with a rear end of a rear door, an opening start device configured to rotate the rear end of the rear door to the outside of the vehicle at an early stage of opening of the rear door, and a closing end device configured to rotate the rear end of the rear door to the inside of the vehicle at a last stage of closing of the rear door; and a guide unit configured to guide a front end of the rear door to move the front end of the rear door in a longitudinal direction of the vehicle at the initial stage of opening of the rear door and the last stage of closing of the rear door.

2. The coach door of claim 1, wherein the opening start device is an actuator installed in a compressed state and configured to rotate the first hinge to the outside.

3. The coach door of claim 2, wherein in the actuator, a piston is inserted into a cylinder and a spring installed in the cylinder in the compressed state elastically supports the piston.

4. The coach door of claim 1, wherein the closing end device is a driving motor, a driving gear is rotated by the driving motor, and a sector gear is engaged integrally with the first hinge and engaged to the driving gear.

5. The coach door of claim 4, wherein the driving gear is a unidirectional rotary gear configured to transmit rotational force from the driving motor to the sector gear.

6. The coach door of claim 1, wherein the opening start device is connected to the first hinge on the inner side of the vehicle other than a virtual line that connects a portion where the first hinge is connected to the vehicle body and a portion where the first hinge and the second hinge are connected.

7. The coach door of claim 6, wherein the first hinge is curved inward of the vehicle.

8. The coach door of claim 1, wherein the guide unit includes:
a guide pin bracket installed at the front end of the rear door and having a guide pin formed at the end; and
a guide having a guide groove configured to guide the guide pin in a longitudinal direction of the vehicle and installed at a vehicle side adjacent to the front end of the rear door when the rear door is completely closed.

9. The coach door of claim 8, wherein the guide groove is formed to accommodate the guide pin.

10. The coach door of claim 9, wherein in the guide groove, the end at the rear side of the vehicle is formed to be opened to the outside of the vehicle.

11. The coach door of claim 10, wherein an opened portion in the guide groove is formed with a width that decreases from the outside to the inside.

12. The coach door of claim 8, wherein the guide pin bracket is installed at each of an upper end and a lower end of the front end of the rear door, and the guide is installed at each portion adjacent to the guide pin bracket in the vehicle body when the rear door is closed.

13. The coach door of claim 8, wherein the guide unit further includes a switch configured to operate the closing end device by detecting completion of first-stage closing of the rear door, which is a state in which the rear door fully rotates around the second hinge.

14. The coach door of claim 1, wherein a center pillar is omitted at a portion where the rear end of the front door and the front end of the rear door contact in the vehicle.

\* \* \* \* \*